US 12,445,705 B2

United States Patent
Mcandrew et al.

(10) Patent No.: US 12,445,705 B2
(45) Date of Patent: Oct. 14, 2025

(54) USING GUIDED FILTER TO ENHANCE DEPTH ESTIMATION WITH BRIGHTNESS IMAGE

(71) Applicant: Analog Devices International Unlimited Company, Limerick (IE)

(72) Inventors: Kevin Joseph Mcandrew, Galway (IE); Krystian Balicki, Wroclaw (PL); Charles Mathy, Arlington, MA (US); Nicolas Le Dortz, Jamaica Plain, MA (US); Jonathan Ephraim David Hurwitz, Edinburgh (GB); Eoin E. English, Pallasgreen (IE); Javier Calpe Maravilla, Valencia (ES)

(73) Assignee: Analog Devices International Unlimited Company, Limerick (IE)

( * ) Notice: Subject to any disclaimer, the term of this patent is extended or adjusted under 35 U.S.C. 154(b) by 384 days.

(21) Appl. No.: 17/890,982

(22) Filed: Aug. 18, 2022

(65) Prior Publication Data
US 2023/0260094 A1     Aug. 17, 2023

Related U.S. Application Data

(60) Provisional application No. 63/310,859, filed on Feb. 16, 2022.

(51) Int. Cl.
*G06T 7/55*     (2017.01)
*G01S 7/4915*   (2020.01)
(Continued)

(52) U.S. Cl.
CPC ........... *H04N 23/56* (2023.01); *G01S 7/4915* (2013.01); *G01S 17/36* (2013.01); *G01S 17/894* (2020.01);
(Continued)

(58) Field of Classification Search
CPC ......... G01S 17/32; G01S 17/18; G06T 7/593; H04N 13/139
See application file for complete search history.

(56) References Cited

U.S. PATENT DOCUMENTS 8,619,122 B2 * 12/2013 Gilboa ................. H04N 13/128
                                                             348/46
8,660,337 B2 *  2/2014 Takahashi ................ G06T 5/94
                                                             382/154

(Continued)

OTHER PUBLICATIONS

Ferstl et al., "Image Guided Depth Upsampling Using Anisotropic Total Generalized Variation," Proceedings of the IEEE International Conference on Computer Vision (ICCV), IEEE, Dec. 1, 2013, pp. 993-1000.
(Continued)

*Primary Examiner* — Stephen R Koziol
*Assistant Examiner* — Dylan J Sherrillo
(74) *Attorney, Agent, or Firm* — ArentFox Schiff LLP

(57) ABSTRACT

A depth estimation system can use a guided filter to enhance depth estimation using brightness image. Light is projected onto an object. The object reflects at least a portion of the projected light. The reflected light is at least partially captured by an image sensor. The depth estimation system may generate a depth image based on a phase shift between the captured light and the projected light and generate a brightness image based on brightness of the captured light. The depth estimation system may use the guided filter to identify a pixel that represents at least a portion of a boundary of the object. The guided filter can determine a depth value of the pixel based on the value of the corresponding pixel in the brightness image. The depth estimation system can assign the depth value to the pixel and generates an enhanced depth image.

20 Claims, 10 Drawing Sheets

(51) Int. Cl.
| | |
|---|---|
| *G01S 17/36* | (2006.01) |
| *G01S 17/894* | (2020.01) |
| *G06T 5/00* | (2024.01) |
| *G06T 5/20* | (2006.01) |
| *G06T 5/50* | (2006.01) |
| *G06T 7/13* | (2017.01) |
| *G06T 7/521* | (2017.01) |
| *H04N 23/11* | (2023.01) |
| *H04N 23/56* | (2023.01) |
| *H04N 23/74* | (2023.01) |
| *H04N 25/705* | (2023.01) |
| *H04N 25/78* | (2023.01) |

(52) U.S. Cl.
CPC .............. *G06T 5/00* (2013.01); *G06T 5/20* (2013.01); *G06T 5/50* (2013.01); *G06T 7/13* (2017.01); *G06T 7/521* (2017.01); *G06T 7/55* (2017.01); *H04N 23/11* (2023.01); *H04N 23/74* (2023.01); *H04N 25/705* (2023.01); *H04N 25/78* (2023.01); *G06T 2207/10028* (2013.01); *G06T 2207/10048* (2013.01); *G06T 2207/20192* (2013.01); *G06T 2207/20221* (2013.01)

(56) References Cited

U.S. PATENT DOCUMENTS

| | | | | |
|---|---|---|---|---|
| 8,687,044 | B2* | 4/2014 | Katz | H04N 13/139 |
| | | | | 348/46 |
| 8,717,414 | B2* | 5/2014 | Kang | H04N 23/90 |
| | | | | 348/42 |
| 8,885,920 | B2* | 11/2014 | Lim | G06V 40/103 |
| | | | | 382/209 |
| 8,983,233 | B2* | 3/2015 | Katz | G01S 17/32 |
| | | | | 348/46 |
| 9,167,230 | B2 | 10/2015 | Min et al. | |
| 10,091,491 | B2* | 10/2018 | Choi | H04N 13/254 |
| 10,132,616 | B2 | 11/2018 | Wang | |
| 10,535,151 | B2 | 1/2020 | Bleyer et al. | |
| 10,931,905 | B2 | 2/2021 | Jin et al. | |
| 11,204,415 | B2 | 12/2021 | Jin et al. | |
| 11,734,801 | B2 | 8/2023 | Ortiz Egea | |
| 2011/0285910 | A1 | 11/2011 | Bamji et al. | |
| 2013/0176426 | A1 | 7/2013 | Ovsiannikov et al. | |
| 2016/0330434 | A1* | 11/2016 | Chen | G01B 11/2513 |
| 2017/0018114 | A1 | 1/2017 | Stewart et al. | |
| 2018/0343438 | A1 | 11/2018 | Cho et al. | |
| 2019/0197735 | A1 | 6/2019 | Xiong et al. | |
| 2021/0356598 | A1 | 11/2021 | Hurwitz | |

OTHER PUBLICATIONS

Hui et al., "Depth Map Super-Resolution by Deep Multi-Scale Guidance," 16th European Conference—Computer Vision, Sep. 17, 2016, pp. 353-369.
International Search Report and Written Opinion in PCT/EP2023/053961, mailed May 15, 2023, 21 pages.
International Search Report and Written Opinion in PCT/EP2023/053974, mailed May 15, 2023, 19 pages.
International Search Report and Written Opinion in PCT/EP2023/053978, mailed May 15, 2023, 20 pages.
Jung et al., "Intensity-guided edge-preserving depth upsampling through weighted L0 gradient minimization," Journal of Visual Communication and Image Representation, Nov. 17, 2016, vol. 42, pp. 132-144.
Li et al., "Guided Depth Map Super-Resolution Using Recumbent Y Network," IEEE Access, IEEE, Jul. 7, 2020, vol. 8, pp. 122695-122708.
Or-El et al., "RGBD-fusion: Real-time high precision depth recovery," 2015 IEEE Conference on Computer Vision and Pattern Recognition (CVPR), IEEE, Jun. 7, 2015, pp. 5407-5416.
Chen et al., Depth image enhancement for kinect using region growing and bilateral filter, in Proceedings of the 21st International Conference on Pattern Recognition (ICPR2012). IEEE, 2012, pp. 3070-3073.
Evangelidis et al., Fusion of range and stereo data for high-resolution scene-modeling, IEEE transactions on pattern analysis and machine intelligence, 2015, vol. 37, No. 11, pp. 2178-2192.
Gu et al., Learning dynamic guidance for depth image enhancement, in Proceedings of the IEEE conference on computer vision and pattern recognition, 2017, pp. 3769-3778.
Izadi et al., Kinectfusion: real-time 3d reconstruction and interaction using a moving depth camera, in Proceedings of the 24th annual ACM symposium on User interface software and technology, 2011, pp. 559-568.
Jeon et al., Reconstruction-based pairwise depth dataset for depth image enhancement using cnn, in Proceedings of the European Conference on Computer Vision (ECCV), 2018, pp. 422-438.
Kim et al., Spatial and temporal enhancement of depth images captured by a time-of-flight depth sensor, in 2010 20th International Conference on Pattern Recognition. IEEE, 2010, pp. 2358-2361.
Mutto et al., Locally consistent tof and stereo data fusion, in European Conference on Computer Vision. Springer, 2012, pp. 598-607.
Park et al., High quality depth map upsampling for 3d-tof cameras, in 2011 International Conference on Computer Vision. IEEE, 2011, pp. 1623-1630.
Russakoff et al., Image similarity using mutual information of regions, in European Conference on Computer Vision. Springer, 2004, pp. 596-607.
Schwarz et al., A weighted optimization approach to time-of-flight sensor fusion, IEEE Transactions on Image Processing, 2013, vol. 23, No. 1, pp. 214-225.
Schwarz et al., Improved edge detection for ewoc depth upscaling, in 2012 19th International Conference on Systems, Signals and Image Processing (IWSSIP). IEEE, 2012, pp. 1-4.
Schwarz et al., Time-of-flight sensor fusion with depth measurement reliability weighting, in 2014 3DTV-Conference: The True Vision-Capture, Transmission and Display of 3D Video (3DTV-CON). IEEE, 2014, pp. 1-4.
Sublime et al., Un algorithme ICM basé sur la compacité pour la segmentation des images satellites à très haute résolution, EGC, 2015, pp. 191-196.
Zakeri et al., Guided optimization framework for the fusion of time-of-flight with stereo depth, Journal of Electronic Imaging, 2020, vol. 29, No. 5, pp. 053016.
Zhang, Image restoration: flexible neighborhood systems and iterated conditional expectations, Statistica Sinica, 1993, pp. 117-139.
Zhu et al., Reliability fusion of time-of-flight depth and stereo geometry for high quality depth maps, IEEE transactions on pattern analysis and machine intelligence, 2010, vol. 33, No. 7, pp. 1400-1414.
Zivkovic et al., Gentle icm energy minimization for markov random fields with smoothness-based priors, Journal of Real-Time Image Processing, 2016, vol. 11, No. 1, pp. 235-246.

* cited by examiner

USING GUIDED FILTER TO ENHANCE DEPTH ESTIMATION WITH BRIGHTNESS IMAGE

CROSS REFERENCE TO RELATED APPLICATION

This application claims the benefit of U.S. Provisional Patent Application No. 63/310,859, filed Feb. 16, 2022, which is incorporated by reference its entirety.

TECHNICAL FIELD OF THE DISCLOSURE

The present disclosure relates generally to depth estimation and, more specifically, to using a guided filter to enhance depth estimation with brightness image.

BACKGROUND

One technique to measure depth is to directly or indirectly calculate the time it takes for a signal to travel from a signal source on a sensor to a reflective surface and back to the sensor. The time travelled is proportional to the distance from the sensor to the reflective surface. This travel time is commonly referred as time of flight (ToF). Various types of signals can be used with ToF sensors, the most common being sound and light. Some sensors use light as their carrier given the advantages of light with respect to speed, range, power, and low weight.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
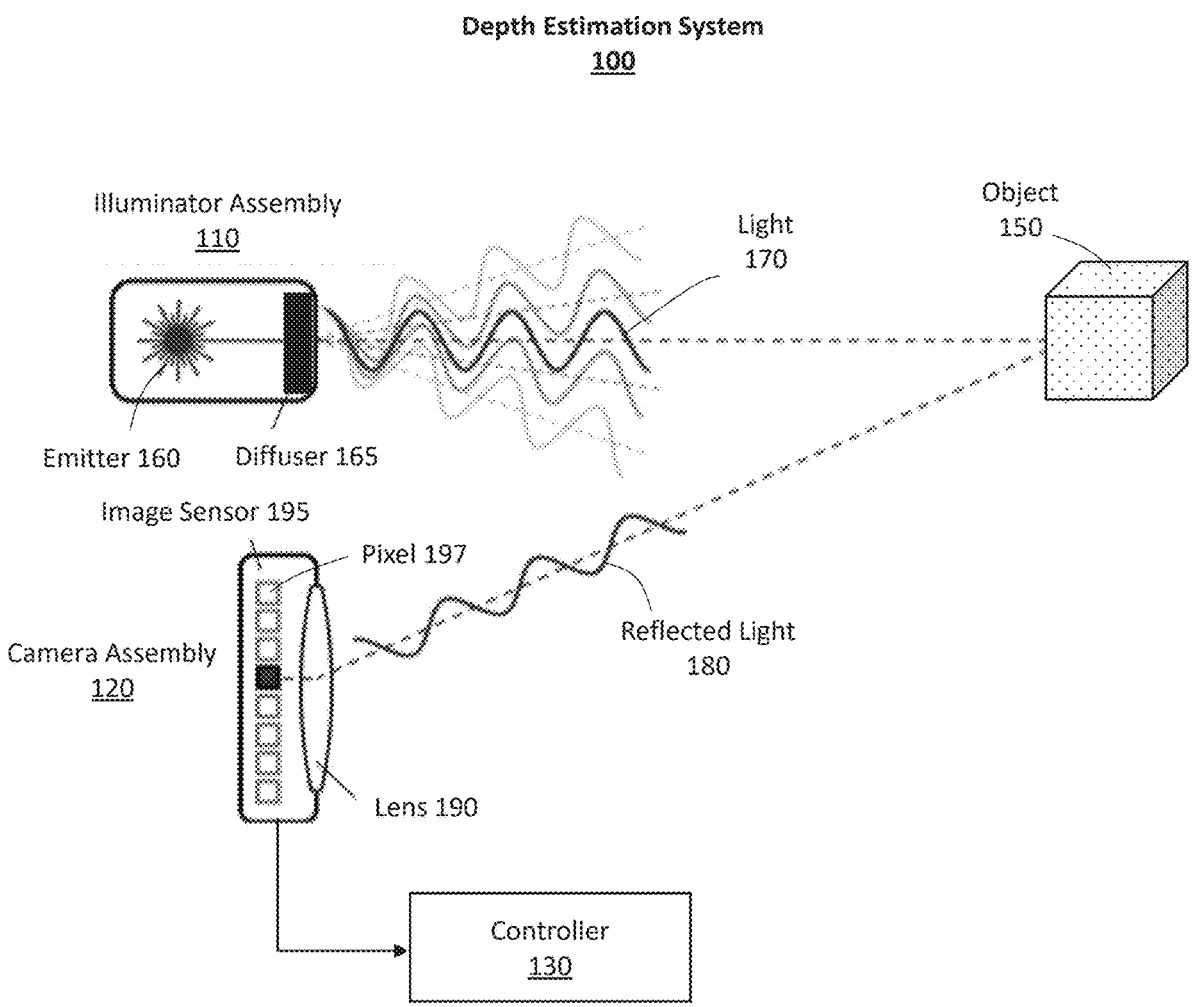
FIG. 1 illustrates a depth estimation system according to some embodiments of the present disclosure.

ToF camera systems are range imaging systems. A ToF camera system typically includes a light source that projects light and an imaging sensor that receives reflected light. The ToF camera system can estimate the distance between the imaging sensor and an object by measuring the round trip of the light. A continuous-wave ToF camera system can project multiple periods of a continuous light wave and determine the distance based on the phase difference between the projected light and the received reflected light. A depth image can be generated based on the phase difference. However, ToF camera systems often fails to accurately estimate depth of boundaries, such as edges of objects, reflectivity boundaries (e.g., a boundary between two areas that have different reflectivity properties), and so on. The inaccurate depth estimation may limit usage of ToF camera systems in many applications, such as virtual reality (VR), augmented reality (AR), or mixed reality (MR) applications, vehicle navigation applications, or other applications. Therefore, improved technology for depth estimation is needed.

Embodiments of the present disclosure relates to a depth estimation system that can use a guided filter to enhance ToF depth estimation using brightness images. A brightness image may be an active brightness image, such as an infrared (IR) image, or a RGB (red, green, and blue) image. The depth estimation system may simultaneously acquire the brightness image and the ToF depth estimation. The brightness image and the ToF depth estimation may be based on same light source (e.g., IR) or different light sources (e.g., visible light for the brightness image versus IR for the ToF depth estimation). Brightness images may have better detection of boundaries and can be used to enhance depth images generated by ToF camera systems.

An example of the depth estimation system includes an illuminator assembly, a camera assembly, and a controller. Light is projected onto an object. The illuminator assembly may project light to illuminate a local area, such as an area that includes an object. The light may be modulated light, such as modulated IR. The illuminator assembly may project pulsed light. Alternatively, the illuminator assembly may project one or more continued waves, such as continued waves of different frequencies. The object can reflect at least a portion of the projected light. The camera assembly captures at least a portion of the reflected light and can convert captured photons to charges and accumulate the charges. The depth estimation system may generate a depth image and a brightness image from the charges accumulated in the camera assembly. In some embodiments, the depth image is based on a phase shift between the captured light and the projected light, and the brightness image based on brightness of the captured light. The depth image may include a plurality of depth pixels, each of which may correspond to a pixel in the brightness image.

The depth estimation system may use a guided filter to determine whether a pixel represents any boundary (or any portion of a boundary) of the object. For a pixel that represents a boundary (or a portion of a boundary) of the object, the guided filter can determine an enhanced depth value of the pixel based on the value of the corresponding pixel in the brightness image. The enhanced depth value can be different from and/or independent of the depth value of the pixel in the depth image. For a pixel that represents a flat plane of the object (i.e., not represent any boundary of the object), the guided filter can determine an enhanced depth value of the pixel based on the depth values of surrounding pixels in the depth image. The enhanced depth value may be an average of the depth values of the surrounding pixels. The depth estimation system can generate an enhanced depth image with the enhanced depth values.

As the depth estimation system can take advantage of brightness images showing cleaner boundaries to enhance depth estimation of boundaries and can also smooth flat planes by using averaged depth values, enhanced depth images generated by the depth estimation system can show the boundaries better than regular ToF depth images. With the more accurate depth estimation, the enhanced depth images can be used in various applications.

Example Depth Estimation System

FIG. 1 illustrates a depth estimation system 100 according to some embodiments of the present disclosure. The depth estimation system 100 may use ToF techniques to generate depth images. The depth estimation system 100 includes an illuminator assembly 110, a camera assembly 120, and a controller 130. The illuminator assembly 110 includes an emitter 160 and a diffuser 165. The camera assembly 120 includes a lens 190 and an image sensor 195. In alternative configurations, different and/or additional components may be included in the depth estimation system 100. Further, functionality attributed to one component of the depth estimation system 100 may be accomplished by a different component included in depth estimation system 100 or a different system than those illustrated. For example, the illuminator assembly 110 may include no diffuser or more than one diffuser. As another example, the camera assembly 120 may include no lens or more than one lens.

The illuminator assembly 110 projects light 170 to a local area that includes an object 140. The emitter 160 is a light source that emits light ("emitted light"). In some embodiments, the emitter 160 may include a laser, such as an IR or near-IR (NIR) laser, an edge emitting laser, vertical-cavity surface-emitting laser (VCSEL), and so on. In other embodiments, the emitter 160 may include one or more light-emitting diodes (LEDs). The emitter 160 can emit light in the visible band (i.e., ~380 nm to 750 nm), in the near IR band (i.e., ~750 nm to 1 mm), in the ultraviolet band (i.e., 10 nm to 380 nm), in the shortwave IR (SWIR) band (e.g., ~900 nm to 2200 nm), some other portion of the electromagnetic spectrum, or some combination thereof. In some embodiments, the illuminator assembly 110 may include multiple emitters 160, each of which may emit a different wavelength. For instance, the illuminator assembly 110 may include a first emitter that emits IR and a second emitter that emits visible light. The diffuser 165 spreads out or scatters the emitted light before the light 170 is projected into the local area. The diffuser 165 may also control brightness of the emitted light. In some embodiments, the diffuser 165 may be translucent or semi-transparent. In other embodiments, the illuminator assembly 110 may include more, fewer, or different components. For instance, the illuminator assembly 110 may include one or more additional diffusers to direct light from the emitter 160 to one or more additional objects in the local area.

The illuminator assembly 110 may project the light 170 as modulated light, e.g., according to a periodic modulation waveform. An example of the periodic modulation waveform may be a sinusoidally modulated waveform. The frequency of the periodic modulation waveform is the frequency of the modulated light.

The illuminator assembly 110 may project one or more continuous waves. For an individual continuous wave, the illuminator assembly 110 may project multiple periods. Different continuous waves may have different wavelengths and frequencies. For instance, the illuminator assembly 110 can project continuous waves having modulation frequencies in a range from 50 MHz to 200 MHz. In an embodiment, the illuminator assembly 110 includes multiple (i.e., at least two) light projectors. The light projectors may project continuous waves having different frequencies. The light projectors may alternate and project the continuous waves at different times. For example, a first light projector projects a first continuous wave having a first frequency during a first time of period. After the first time of period, a second light projector projects a second continuous wave having a second frequency during a second time of period. After the second time of period, a third light projector projects a third continuous wave having a third frequency during a third time of period. The three continuous waves may constitute a cycle. This cycle can repeat.

In another embodiment, the illuminator assembly 110 may include one light projector that projects all the three continuous waves. In other embodiments, the illuminator assembly 110 may project a different number of continuous waves, such as two or more than three. One cycle may constitute one frame. The total time for a cycle may be 10-20 ms. The illuminator assembly 110 can project light through multiple cycles for obtaining multiple frames. There may be time gap between cycles. More information regarding modulated light having multiple frequencies is provided below in conjunction with FIG. 2.

At least a portion of the object 140 is illuminated by the light 170. For purpose of simplicity and illustration, the object 140 in FIG. 1 has a shape of a cube. In other embodiments, the object 140 may have other shapes or structures. Even though not shown in FIG. 1, the local area may include other objects that can be illuminated by the light. The object reflects the light, reflected light 180, and the reflected light 180 can be captured by the camera assembly 120.

The camera assembly 120 captures image data of at least a portion of the local area illuminated with the light 170. For instance, the camera assembly 120 captures the reflected light 180 and generates image data based on the reflected light 180. The reflected light 180 may be IR. In some embodiments, the camera assembly 120 may also capture visible light reflected by the object 140. The visible light may be projected by the illuminator assembly 110, ambient light, or a combination of both.

Even though the camera assembly 120 is separated from the illuminator assembly 110 in FIG. 1, in some embodiments, the camera assembly 120 is co-located with the illuminator assembly 110 (e.g., may be part of the same device). The lens 190 receives the reflected light 180 and directs the reflected light 180 to the image sensor 195. The image sensor 195 includes a plurality of pixels 197. Even though the pixels 197 shown in FIG. 1 are arranged in a column, pixels 197 of the image sensor 195 may also arranged in multiple columns.

In some embodiments, a pixel 197 includes a photodiode that is sensitive to light and converts collected photons to charges, e.g., photoelectrons. Each of the photodiodes has one or more storage regions that store the charges. The image sensor 195 may be both a ToF sensor and a brightness sensor. A pixel 197 may be a depth-sensing pixel, a brightness-sensing pixel, or both. A depth-sensing pixel is configured to present a depth output signal that is dependent on the distance from the image sensor 195 to the locus of the object 140 imaged onto the depth-sensing pixel. Such distance is a 'depth' of the locus of the object 140. Each depth-sensing pixel may independently determine a distance to the object 140 viewed by that pixel. The depth output signals of the depth-sensing pixels in the image sensor 195 can be used to generate a depth image of the local area. A brightness-sensing pixel is configured to present a brightness output signal that is dependent on brightness of light reflected from the locus of the object 140 imaged onto the brightness-sensing pixel. The brightness output signals of the brightness-sensing pixels in the image sensor 195 can be used to generate a brightness image of the local area. The brightness image may be an active brightness image. An example of the brightness image is an IR image. In some embodiments, each pixel 197 of the image sensor 195 may generate both a depth output signal and a brightness output signal from the reflected light that the pixel 197 captures. In other embodiments, the image sensor 195 includes two sets of pixels 197: one set is for sensing depth and the other set is for sensing brightness. The output signals of the image sensor 195 may be analog signals, such as electrical charges.

In embodiments where the illuminator assembly 110 projects multiple continuous waves or multiple cycles of modulated light, the image sensor 195 can be synchronized with the projection of the illuminator assembly 110. For example, the image sensor 195 may have one or more exposure intervals, during which the image sensor 195 takes exposures of the portion of the local area and charges are accumulated in the image sensor 195. Outside the exposure interval, the image sensor 195 does not take exposures. In some embodiments, an exposure interval of the image sensor 195 may be synchronized with a continuous wave or cycle projected by the illuminator assembly 110. For instance, the exposure interval starts before or when the continuous wave or cycle starts and ends when or after the continuous wave or cycle ends. In other embodiments, the image sensor 195 may have multiple exposure intervals for a single continuous wave. For instance, the image sensor 195 may take multiple exposures during a continuous wave, and the multiple exposures may correspond to different phase offsets. In an example, there are three exposure intervals for one continuous wave at three different phase offsets, such as 0° (0), 120° ($2\pi/3$), and 240° ($4\pi/3$). There may be a time gap between the exposure intervals. The time gap may be 1-2 milliseconds (ms). The exposure intervals may have a constant duration, e.g., approximately 100 microseconds (µs). In alternative embodiments, the exposure intervals may have different durations.

In some embodiments, the image sensor 195 may use global shutter scanning. The image sensor 195 includes a global shutter that may open and scan during each exposure interval and closes when the exposure interval ends. Additionally or alternatively, the image sensor 195 may include a tunable filter. The tunable filter blocks light from arriving at the detector and may be mounted anywhere in the optical path of the reflected light 180. For example, the tunable filter is attached on top of the image sensor 195 or at the front of the camera assembly 120. The tunable filter can be switched between on (active) and off (inactive). The tunable filter can be inactive during an exposure interval and active when the exposure internal ends. When the tunable filter is inactive, light can pass the tunable filter and reach the image sensor 195. When the tunable filter is active, light is blocked from the image sensor 195.

In some embodiments, when the tunable filter is active, it may let light of a certain wavelength (or a certain band of wavelengths) pass but block light of other wavelengths. For instance, the tunable filter may let light of the wavelengths projected by the illuminator assembly 110 (e.g., the light 170) pass, but block light of other wavelengths, which can, for example, reduce noise in the image data captured by the image sensor 195. In an example where the light 170 is IR, the tunable filter may block visible light. In other embodiments, when the tunable filter is active, it can block light of all wavelengths to avoid charge accumulation in the image sensor 195. In embodiments where the tunable filter blocks all light, dark noise calibration of the image sensor 195 can be conducted.

The camera assembly 120 may read out stored photoelectrons from the image sensor 195 to obtain image data, e.g., from storage regions of each pixel 197 of the image sensor 195. During the readout, the camera assembly 120 can convert the photoelectrons into digital signals (i.e., analog-to-digital conversion). In embodiments where the illuminator assembly 110 includes multiple light projectors, photoelectrons corresponding to pulses of modulated light projected by different light projectors may be stored in separate storage regions of each photodiode. The camera assembly 120 may read out the separate storage regions to obtain the image data. In some embodiments, the camera assembly 120 may read out all the image data stored in the image sensor 195. In other embodiments, the camera assembly 120 may read out some of the image data stored in the image sensor 195. For example, in embodiments where an exposure interval of the image sensor 195 is synchronized with a continuous wave projected by the illuminator assembly 110, the camera assembly 120 may execute multiple readout intervals for the continuous wave. Each readout interval may correspond to a different phase offset. In an example, there are three readout intervals for one continuous wave at three different phase offsets, such as 0°, 120°, and 240°. There may be a time gap between the readout intervals. The time gap may be 1-2 milliseconds (ms). The readout intervals may have a constant duration, e.g., approximately 100 microseconds (µs). In alternative embodiments, the readout intervals may have different durations.

The controller 130 controls the illuminator assembly 110 and the camera assembly 120. For instance, the controller 130 provides illumination instructions to the illuminator assembly 110, and the illuminator assembly 110 projects the light 170 in accordance with the illumination instructions. The controller 130 can also provide imaging instructions to the camera assembly 120, and the camera assembly 120 takes exposures and reads out image data in accordance with the imaging instructions.

The controller 130 also determines depth information using image data from the camera assembly 120. For instance, the controller 130 can generate depth images from the image data. A depth image includes a plurality of depth pixels. Each depth pixel has a value corresponding to an estimated depth, e.g., an estimated distance from a locuslocus of the object 140 to the image sensor 195. A single depth image may also be referred to as a depth frame or a depth map. In embodiments where the illuminator assembly 110 projects a continuous wave of modulated light, the controller 130 may determine depth information based on the phase shift between the light 170 projected by the illuminator assembly 110 and the reflected light 180. In embodiments where the camera assembly 120 reads out image data corresponding to different phase offsets of modulated light, the controller 130 may perform phase unwrapping to determine depth information. In some embodiments (e.g., embodiments where the illuminator assembly 110 projects multiple cycles of modulated light), the controller 130 may generate multiple depth frames.

The controller 130 can also generate a brightness image that corresponds to a depth image. The image data for the brightness image and the image data for the depth image may be generated by the camera assembly 120 from same light, such as the reflected light 180. In some embodiments, the brightness image and the depth image are generated simultaneously. For instance, the camera assembly 120 may simultaneously reads out the image data for the brightness image and the image data for the depth image. In an embodiment, the image data for the brightness image and the image data for the depth image are the same image data. The brightness image may include a plurality of brightness pixels. Each brightness pixel has a value corresponding to a light intensity, e.g., an IR intensity. A brightness pixel in the brightness image may correspond to a depth pixel in the depth image. The brightness pixel and the depth pixel may be generated from light reflected from the same locus of the object 140. For instance, the brightness pixel and the depth pixel may be generated based on signals from the same pixel 197 of the image sensor 195, and the pixel 197 captures the light reflected from the locus of the object 140.

The controller 130 can further enhance depth estimation in a depth image by applying a guided filter on the depth image using the corresponding brightness image as a reference. The brightness image may show one or more cleaner boundaries of the object 140 than the depth image. For instance, one or more depth pixels that represent at least a portion of a boundary of the object 140 may be invalid. The boundary may be an edge of the object 140. Alternatively, the boundary is a boundary between two areas of the object 140 that have different reflectivity properties, such as a boundary between a fluorescent strip, which has relatively high reflectivity, and a low reflectivity surface. An invalid depth pixel is a result of an invalid depth estimation, and a difference from the value of an invalid depth pixel and the ground-truth depth value may be beyond a threshold, such as 5%, 10%, or other percentages of the ground-truth depth value. The controller 130 may take advantage of the more accurate information of the boundaries of the object 140 in the brightness image to generate an enhanced depth image, which includes better depth estimation than the original depth image. Certain aspects of the controller 130 are described below in conjunction with FIG. 4.

Example Modulated Signals

Figure 2A:
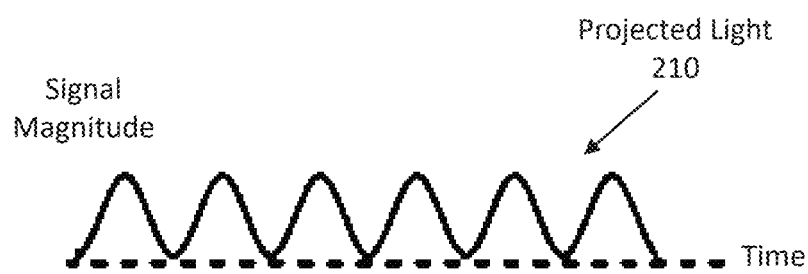
FIG. 2A illustrates a continuous wave of a projected signal 210 according to some embodiments of the present disclosure.

FIG. 2A illustrates a continuous wave of a projected signal 210 according to some embodiments of the present disclosure. The projected signal 210 is a modulated signal, e.g., a modulated light projected by the illuminator assembly 110 in FIG. 1. The projected signal 210 has a sinusoidally modulated waveform. In the embodiments of FIG. 2A, the sinusoidally modulated waveform may be represented by the following equation:

$$S(t) = A_s \sin(2\pi ft) + B_s$$

Where t denotes time, S denotes optical power of projected signal, f is the frequency of the modulated signal (i.e., modulation frequency), $\pi$ is the mathematical constant, $A_s$ denotes the amplitude of the modulated signal, $B_s$ denotes an offset of the modulated signal that may include attenuated original offset and/or an offset due to presence of ambient light (e.g., sunlight or light from artificial illuminants).

Figure 2B:
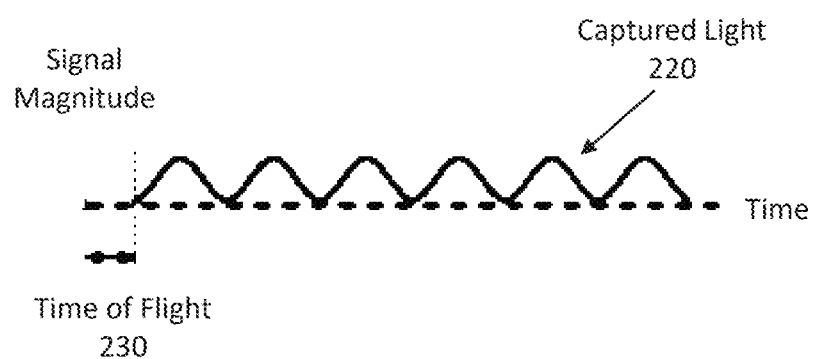
FIG. 2B illustrates a continuous wave of a captured signal 220 according to some embodiments of the present disclosure.

FIG. 2B illustrates a continuous wave of a captured signal 220 according to some embodiments of the present disclosure. The captured signal 220 is a captured portion of modulated light reflected by an object illuminated by the projected signal 210. The captured signal 220 may be captured by the image sensor 195 and may be at least a portion of the reflected light 180 in FIG. 1. In the embodiments of FIG. 2A, the captured signal 220 can be represented by the following equation:

$$r(t) = \alpha(A_s \sin(2\pi ft + \varphi) + B_s)$$

$$\varphi = 2\pi f \delta$$

$$\delta = \frac{2d}{c}$$

where r denotes the optimal power of the captured signal 220, a denotes an attenuation factor of the captured signal 220, φ denotes a phase shift between the waveform of the captured signal 220 and the waveform of the projected signal 210, δ is time delay between the captured signal 220 and the projected signal 210, d denotes the distance from the image sensor 195 to the object 140 (i.e., the depth of the object 140), and c is the speed of light.

Figure 3:
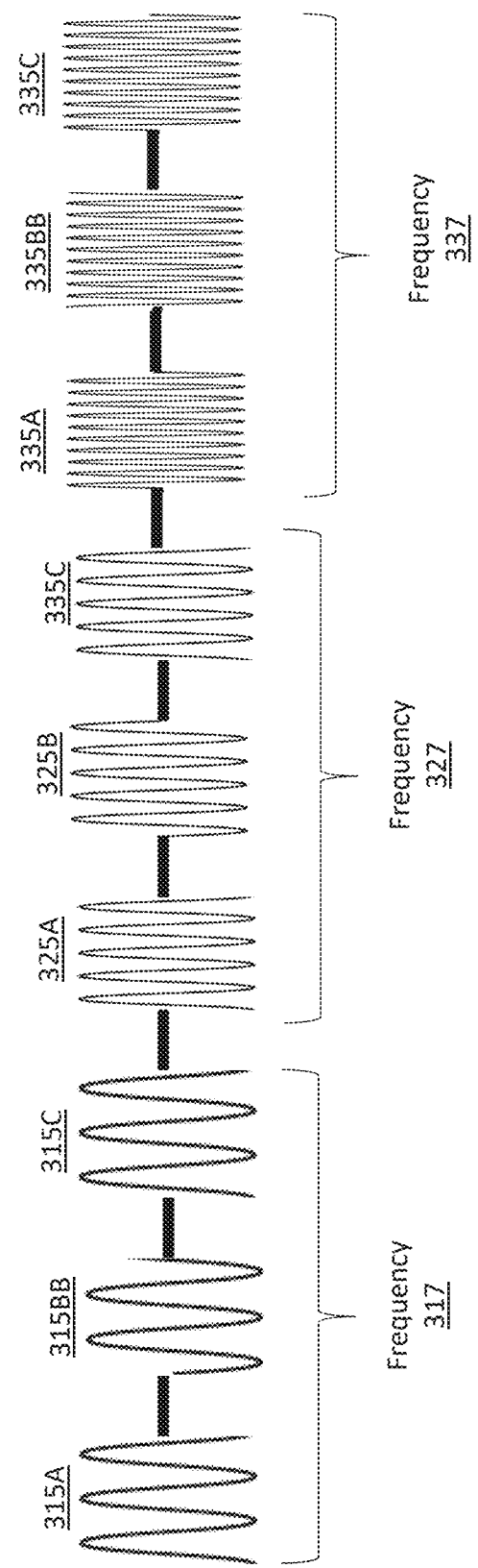
FIG. 3 illustrates a cycle of continuous waves of modulated light according to some embodiments of the present disclosure.

FIG. 3 illustrates a cycle 310 of continuous waves 315A-C, 325A-C, and 335A-C of modulated light according to some embodiments of the present disclosure. The continuous waves 315A-C, 325A-C, and 335A-C are sinusoidal waves in FIG. 3. In other embodiments, the continuous waves 315A-C, 325A-C, and 335A-C may have different waveforms. The continuous waves 315A-C has a frequency 317, the continuous waves 325A-C has a frequency 327, and the continuous waves 335A-C has a frequency 337. The three frequencies 317, 327, and 337 are different from each other. In the embodiments of FIG. 3, the frequency 317 is smaller than the frequency 327, and the frequency 327 is smaller than the frequency 337. The three frequencies 317, 327, and 337 may be in a range from 50 to 200 MHz or higher frequencies.

In an embodiment, the cycle 310 may be a cycle of projecting the modulated light by the illuminator assembly 110 in FIG. 1. In another embodiment, the cycle 310 may be a cycle of exposure by the camera assembly 120. For instance, the camera assembly 120 may take exposures during the periods of times of the continuous waves 315A-C, 325A-C, and 335A-C and not take exposures beyond these periods of times, despite that the illuminator assembly 110 may project modulated light beyond these periods of times. In yet another embodiment, the cycle 310 may be a cycle of readout by the camera assembly 120. For instance, the camera assembly 120 may read out charges accumulated in the image sensor 195 during the periods of times of the continuous waves 315A-C, 325A-C, and 335A-C and not read out charges beyond these periods of times, despite that the illuminator assembly 110 may project modulated light beyond these periods of times or that the image sensor 195 may take exposures beyond these periods of times. Even though the cycle 310 in FIG. 3 includes three continuous waves for each of the three frequencies, a cycle in other embodiments may include a different number of frequencies or a different number of continuous waves for each frequency.

In FIG. 3, the continuous waves 315A-C have different phase offsets. For instance, the continuous wave 315A has a phase offset of 0°, the continuous wave 315B has a phase offset of 120°, versus the continuous wave 315C has a phase offset of 240°. Similarly, the continuous waves 325A-C may have different phase offsets from each other: the continuous wave 325A may have a phase offset of 0°, the continuous wave 325B may have a phase offset of 120°, versus the continuous wave 325C may have a phase offset of 240°; and the continuous waves 335A-C may start at different phase offsets from each other: the continuous wave 335A may have a phase offset of 0°, the continuous wave 335B may have a phase offset of 120°, versus the continuous wave 335C may have a phase offset of 240°. The continuous waves 315A, 325A, and 335A may each have a phase between 0° and 120°, the continuous waves 315B, 325B, and 335B may each have a phase between 120° and 240°, and the continuous waves 315C, 325C, and 335C may each have a phase between 240° and 360°. In some embodiments, each continuous wave may have a time duration of around 100 μs. A time gap between two adjacent continuous waves may be in a range from 1 to 2 ms.

In other embodiments, the cycle 310 may not have multiple continuous waves for each frequency. Rather, the cycle 310 has a single continuous wave for an individual frequency. For instance, the cycle 310 may include a first continuous wave for the frequency 317, and a second continuous wave for the frequency 327, and a third continuous wave for the frequency 337. The first, second, and third continuous waves may all start at 0°. There may be a time gap between two adjacent continuous waves of the first, second, and third continuous waves. The cycle 310 may produce image data for the controller 130 to generate a frame. The cycle 310 can be repeated for the controller 130 to generate more frames. The controller 130 may perform phase unwrapping to determine depth information.

Example Controller

Figure 4:
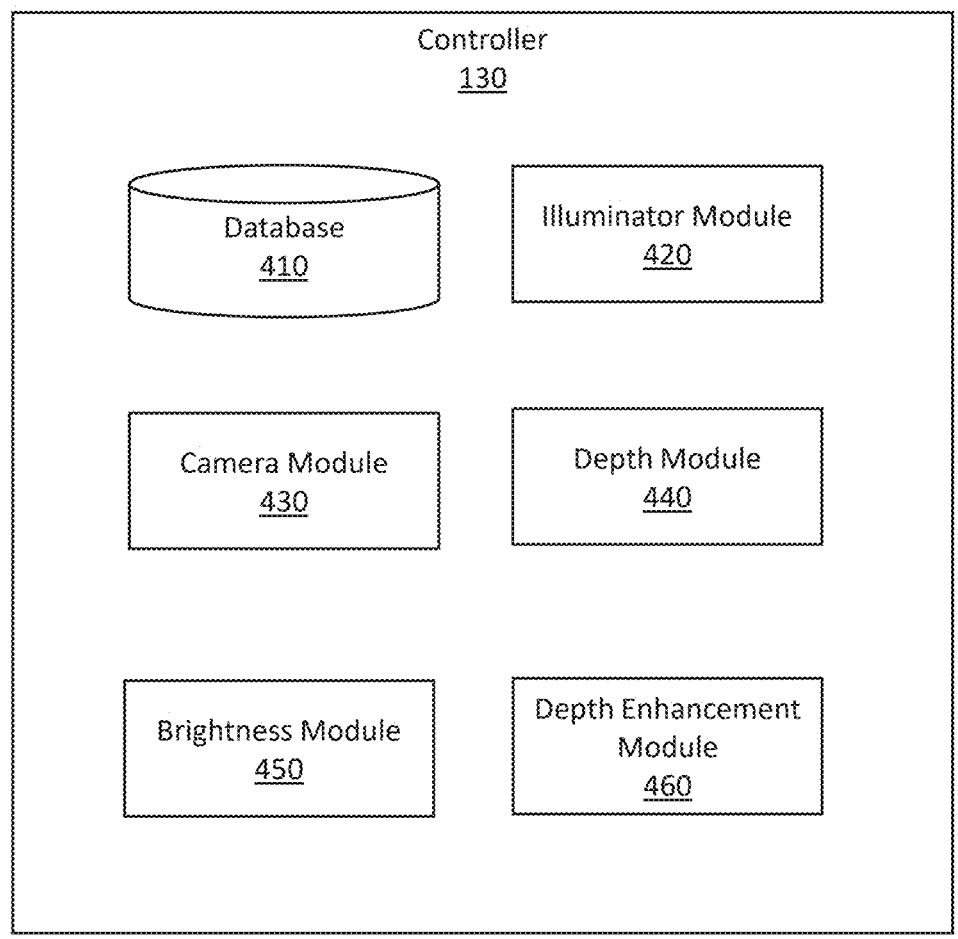
FIG. 4 is a block diagram illustrating a controller according to some embodiments of the present disclosure.

FIG. 4 is a block diagram illustrating the controller 130 according to some embodiments of the present disclosure. The controller 130 includes a database 410, an illuminator module 420, a camera module 430, a depth module 440, a brightness module 450, and a depth enhancement module 460. These modules are software modules implemented on one or more processors, dedicated hardware units, or some combination thereof. Some embodiments of the controller 130 have different components than those described in conjunction with FIG. 4. Similarly, functions of the components described in conjunction with FIG. 4 may be distributed among other components in a different manner than described in conjunction with FIG. 4. For example, some or all of the functionality described as performed by the controller 130 may be performed by a device that incorporates a depth estimation system, such as the system 600 in FIG. 6, the mobile device 700 in FIG. 7, the entertainment system 800 in FIG. 8, the robot 900 in FIG. 9, or other devices.

The database 410 stores data generated and/or used by the controller 130. The database 410 is a memory, such as a ROM, DRAM, SRAM, or some combination thereof. The database 410 may be part of a larger digital memory of a depth estimation system, such as the depth estimation system 100, or a device that incorporates the depth estimation system. In some embodiments, the database 410 stores image data from the camera assembly 120, depth images generated by the depth module 440, brightness images generated by the brightness module 450, enhanced depth images generated by the depth enhancement module 460, baseline data from the calibration module 470 describing trained or established baseline prior to depth measurement, and so on. In some embodiments, the database 410 may store calibration data and/or other data from other components, such as depth instructions. Depth instructions include illuminator instructions generated by the illuminator module 420 and camera instructions generated by the camera module 430.

The illuminator module 420 controls the illuminator assembly 110 via illuminator instructions. The illuminator instructions include one or more illumination parameters that control how light is projected by the illuminator assembly 110. An illumination parameter may describe, e.g., waveform, wavelength, amplitude, frequency, phase offset, starting time of each continuous wave, ending time of each continuous wave, duration of each continuous wave, some other parameter that controls how the light is projected by the illuminator assembly 110, or some combination thereof. The illuminator module 420 may retrieve the illuminator instructions from the database 350. Alternatively, the illuminator module 420 generates the illuminator instructions. For example, the illuminator module 420 determines the one or more illumination parameters. In embodiments where the illuminator assembly 110 include multiple modulated light projectors, the illuminator module 420 may determine separate illumination parameters for different light projectors.

The camera module 430 controls the camera assembly 120 via camera instructions. The camera module 430 may retrieve camera instructions from the database 410. Alternatively, the camera module 430 generates camera instructions based in part on the illuminator instructions generated by the illuminator module 420. The camera module 430 determines exposure parameters (such as starting time, ending time, or duration of an exposure interval, etc.) of the camera assembly 120, e.g., based on one or more illumination parameters (such as duration of a continuous wave, etc.) specified in the illuminator instructions. For example, the camera module 430 determines that the duration of an exposure equals the duration of a continuous wave. Sometimes the camera module 430 determines that duration of an exposure is longer than the duration of a continuous wave to avoid failure to collect a whole continuous wave due to delay in incoming light. The duration of an exposure can be 20% longer than the duration of a continuous wave. In some embodiments, the camera module 430 also determines a number of exposure intervals for each continuous wave of modulated light projected by the illumination assembly 110.

The camera instruction may include readout instructions for controlling readouts of the camera assembly 120. The camera module 430 may determine readout parameters (such as starting time, ending time, or duration of a readout interval, etc.) of the camera assembly 120. For example, the camera module 430 determines a starting time for each of one or more readout intervals, e.g., based on one or more illumination parameters (such as phase, waveform, starting time, or other parameters of a continuous wave). The camera module 430 may also determine a duration for each readout interval, the number of readout intervals for a continuous wave, time gap between adjacent readout intervals, the number of readout cycles, other readout parameters, or some combination thereof.

The depth module 440 is configured to generate depth images indicative of distance to the object 140 being imaged, e.g., based on digital signals indicative of charge accumulated on the image sensor 195. The depth module 440 may analyze the digital signals to determine a phase shift exhibited by the light (e.g., the phase shift φ described above in conjunction with FIG. 2) to determine a ToF (e.g., the ToF δ described above in conjunction with FIG. 2) of the light and further to determine a depth value (e.g., the distance d described above in conjunction with FIG. 2) of the object 140.

In embodiments where the illumination assembly 110 projects multiple continuous waves that have different phase offsets, the depth module 440 can generate a depth image through phase unwrapping. Taking the cycle 310 in FIG. 3 for example, the depth module 440 may determine wrapped distances, each of which corresponds to a respective phase. The depth module 440 can further estimate unwrapped depths for each of the wrapped distances. The depth module 440 further determines Voronoi vectors corresponding to the unwrapped depths and generate a lattice of Voronoi cells. Each unwrapped depth corresponds to a Voronoi cell of the lattice. In alternate embodiments, the depth module 440 is configured to determine depth information using a ratio of charge between the storage regions associated with each photodiode of the camera assembly 120.

The brightness module 450 generates brightness images, such as active brightness images. In some embodiments, for a depth image generated by the depth module 440, the brightness module 450 generates a corresponding brightness image. The brightness module 450 may generate a brightness image in accordance with a request for the brightness image from the depth enhancement module 460. The brightness module 450 may generate the depth image based on a phase shift between first captured light and projected light, and generate the corresponding brightness image based on the intensity or amplitude of second captured light. In some embodiments, the first captured light and the second capture light are same light. In other embodiments, the second captured light is different from the first captured light. For instance, the first captured light may be IR, versus the second captured light may be visible light.

In embodiments where the depth module 440 generates the depth image based on charges accumulated in a set of pixels 197 of the image sensor 195, the brightness module 450 may generate the corresponding brightness image based on charges accumulated in all or some of the pixels 197 in the set. The corresponding brightness image includes a plurality of brightness pixels. Each brightness pixel may correspond to a depth pixel in the depth image. For instance, the values of the depth pixel and corresponding brightness pixel may be both determined based on charges accumulated in a same pixel 197 in the image sensor 195. The charges accumulated in the pixel 197 may be converted from photons of modulated light reflected by a locus of the object 140. The value of the depth pixel may be determined by the depth module 440 based on a phase shift in the waveform of the modulated light. The value of the corresponding brightness pixel may be determined based on the accumulated charge in that pixel 197 or a different pixel 197.

The depth enhancement module 460 enhances depth estimation made by the depth module 440 based on brightness images generated by the brightness module 450. For instance, the depth enhancement module 460 may determine that a depth image includes one or more invalid depth pixel. An invalid depth pixel is a depth pixel having a value indicating an invalid depth measurement. In response to determining that the depth image includes one or more invalid depth pixel, the depth enhancement module 460 may either retrieve a corresponding brightness image generated by the brightness module 450 or instruct the brightness module 450 to generate the corresponding brightness image.

The depth enhancement module 460 further uses a guided filter to fuse the depth image and the corresponding brightness image to enhance depth estimation. The depth enhancement module 460 may use the guided filter to identify one or more invalid depth pixels in the depth image. In some embodiments, the depth enhancement module 460 uses the guided filter to identify one or more depth pixels on a boundary of the object 140 and consider the one or more depth pixels on a boundary as invalid pixels. In other embodiments, the depth enhancement module 460 may compare the depth value of a pixel in the depth image with a depth value of the pixel determined by the guided filter and determine whether the pixel is invalid based on the comparison. For instance, in response to determining that a difference between the depth value in the depth image and the depth value from the guided filter is beyond a threshold (e.g., a threshold absolute value or a threshold percentage), the depth enhancement module 460 may determine that the pixel is invalid.

In an example, the depth enhancement module 460 uses the depth image as an input image of the guided filter and uses the brightness image as a guidance image of the filter. The depth enhancement module 460 may define the guided filter based on an assumption that there is a local linear model between the guidance image and the filtering output (i.e., the output of the guided filter). The local linear model can be expressed as:

$$q_i = a_k I_i + b_k, \forall i \in w_k$$

where $a_k$ and $b_k$ are weights (which may also be referred to as linear coefficients) assumed to be constant in a box $w_k$ that is centered at a pixel having an index k and includes one or more other pixels, i is the index of a pixel in the box $w_k$, I is the guidance, and q is the filtering output. Because $\nabla q = a \nabla I$, this model may ensure that when the guidance has a boundary, the filtering output also has a boundary, and that when the guidance does not have any boundary, the filtering output also does not have any boundary.

In some embodiments, the depth enhancement module 460 identifies a target pixel having a pixel index k. The value of the target pixel k in the depth image is an input $p_k$. The value of the target pixel k in the brightness image is a guidance $I_k$. The depth enhancement module 460 also defines a box $w_k$ centered at the target pixel k and determines a mean value of the pixels in the box $w_k$. The mean value of pixels in the box $w_k$ in the depth image is $\bar{p}$, and the mean value in the brightness image is $\bar{I}$. The depth enhancement module 460 may also determine a regularization coefficient ε. The regularization coefficient E may penalize large weight $a_k$. The depth enhancement module 460 may determine weights a and b based on the following cost function:

$$E(a_k, b_k) = \sum_{i \in w_k} (a_k I_i + b_k - p_i)^2 + \epsilon a_k^2$$

The depth enhancement module 460 may further perform a linear regression to obtain:

$$a_k = \frac{\mathrm{cov}(I, p)}{\mathrm{var}(I) + \epsilon}$$

-continued $$b_k = \overline{p_k} - a_k \overline{I}$$

where cov denotes covariance, var denotes variance. The a weight is calculated using the covariance and variance of a kernel which is calculated with box blurs. In embodiments where $$\epsilon = 0, a = \frac{\text{cov}(I, p)}{\text{var}(I)} \approx 1.$$

In embodiments where $\epsilon = \infty$, a=0.

The depth enhancement module 460 may determine that the target pixel k represents at least a locus of a boundary of the object 140 based on that the a weight has a value of 1 or substantially similar to 1. The depth enhancement module 460 may determine that the target pixel k represents at least a locus of a flat plane of the object 140 based on that the a weight has a value of 0 or substantially similar to 0. A flat plane is a portion of the object 140 that does not include any portion of any boundary of the object 140. The depth enhancement module 460 determines a new value $q_k$ for the target pixel k based on the following equation:

$$q_k = aI_k + b$$

In embodiments where a=1 and the target pixel k is considered to represent at least a locus of a boundary of the object 140, $q_k = I_k + \overline{p} - \overline{I}$. A may be equivalent or similar to $\overline{I}$, so the new value $q_k$ may be equivalent or similar to $I_k$. In embodiments where a=0 and the target pixel k is considered to represent at least a locus of a flat plane of the object 140, $q_k = \overline{p}$, i.e., the mean depth value of the pixels in the box.

The depth enhancement module 460 may determine the a weight for all or some of the pixels in the depth image. As described above, in response to a determination that a pixel represents at least a locus of a boundary, the depth enhancement module 460 determines a new depth value for the pixel based on the value of the pixel in the brightness image. In response to a determination that a pixel does not represent any locus of any boundary, the depth enhancement module 460 generates a new depth value for the pixel based on the depth values of other pixels in a box centered at the pixel. The depth enhancement module 460 may generate an enhanced depth image with the new depth values. For instance, the depth enhancement module 460 may replace the value of a depth pixel with the new depth value. The enhanced depth image represents better depth estimation, especially for one or more boundaries of the object 140.

Example Depth Estimation Enhancement

Figure 5A:
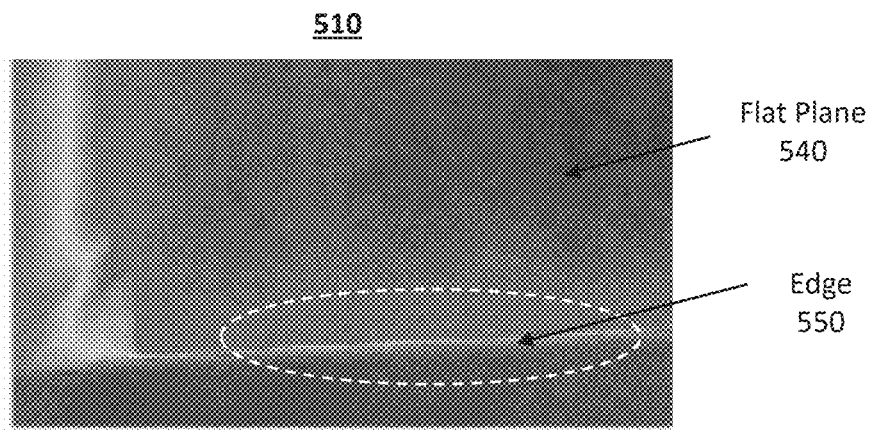
FIG. 5A illustrates an example depth image according to some embodiments of the present disclosure.
Figure 5B:
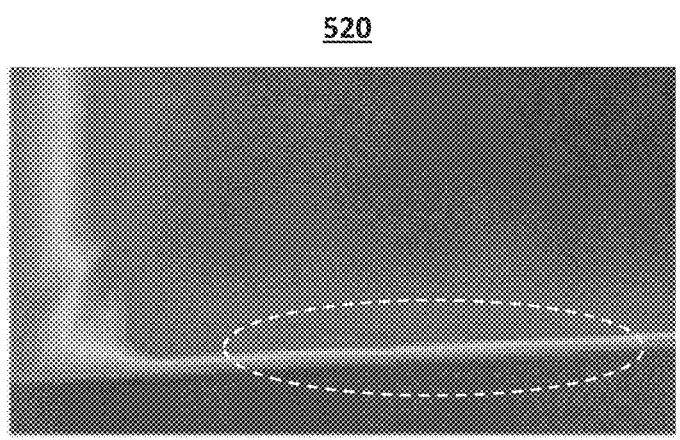
FIG. 5B illustrates an example brightness image corresponding to the depth image in FIG. 5A according to some embodiments of the present disclosure.
Figure 5C:
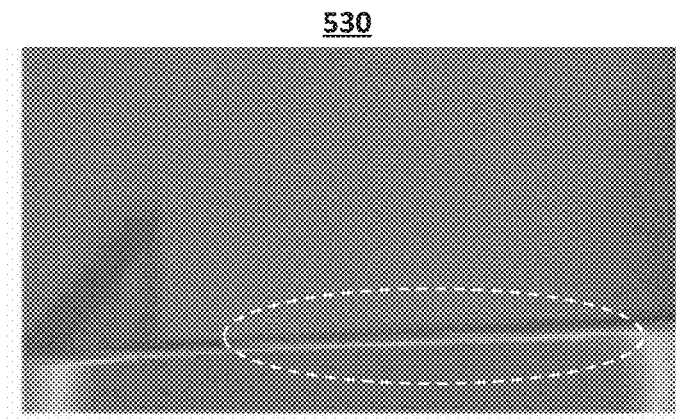
FIG. 5C illustrates an example depth enhanced image generated from the depth image in FIG. 5A and the brightness image in FIG. 5B according to some embodiments of the present disclosure.

FIG. 5A illustrates an example depth image 510 according to some embodiments of the present disclosure. The depth image 510 may be generated by the depth module 440 described above in conjunction with FIG. 4. FIG. 5B illustrates an example brightness image 520 corresponding to the depth image 510 in FIG. 5A according to some embodiments of the present disclosure. The brightness image 520 may be generated by the brightness module 450 described above in conjunction with FIG. 4. FIG. 5C illustrates an example depth enhanced image 530 generated from the depth image 510 in FIG. 5A and the brightness image 520 in FIG. 5B according to some embodiments of the present disclosure.

The three images 510, 520, and 530 captures an object, an example of which is the object 140 in FIG. 1. The object has a flat plane 540 and an edge 550. A part of the edge is enclosed in the dashed oval shapes in FIGS. 5A-5C. As shown in FIGS. 5A and 5B, the brightness image 520 shows a cleaner edge than the depth image 510. Thus, the brightness image 520 can be used to enhance depth estimation of the object, particularly the edge 550 of the object. The brightness image 520 is fused with the depth image 510 through a guided filter to generate the depth enhanced image 530. The depth enhanced image 530 shows better depth estimation than the depth image 510. As shown in FIGS. 5A and 5C, the edge in the depth enhanced image 530 is cleaner than the depth image 510. The depth enhanced image 530 may be generated by using a guided filter, where the depth image 510 is an input image of the guided filter, and the brightness image 520 is a guidance image of the guided filter. The depth enhanced image 530 may be generated by the depth enhancement process described above in conjunction with the depth enhancement module 460. For instance, the pixels representing the edge 550 are identified and new depth values for the pixels are determined based on the values of the pixels in the brightness image 520. The new depth values of the pixels are used to generate the depth enhanced image 530.

FIGS. 5A and 5C also show that the flat plane 540 is smoother in the depth enhanced image 530. In some embodiments of FIGS. 5A-5C, pixels representing the flat plane 540 are also identified. For each of these pixels, a box is defined. The box may be centered at the pixel and include other pixels that surround the pixel. A new depth value of the pixel is determined based on depth values of the other pixels in the box. For instance, the new depth value of the pixel may be an average of the depth values of the other pixels. The new depth values of the pixels are used to generate the depth enhanced image 530. Through such a depth enhancement process, the depth enhanced image 530 represents more accurate depth estimation of the object, such as more accurate depth estimation of the flat plane 540, the edge 550, or both.

Example Applications Incorporating Depth Estimation System

Figure 6:
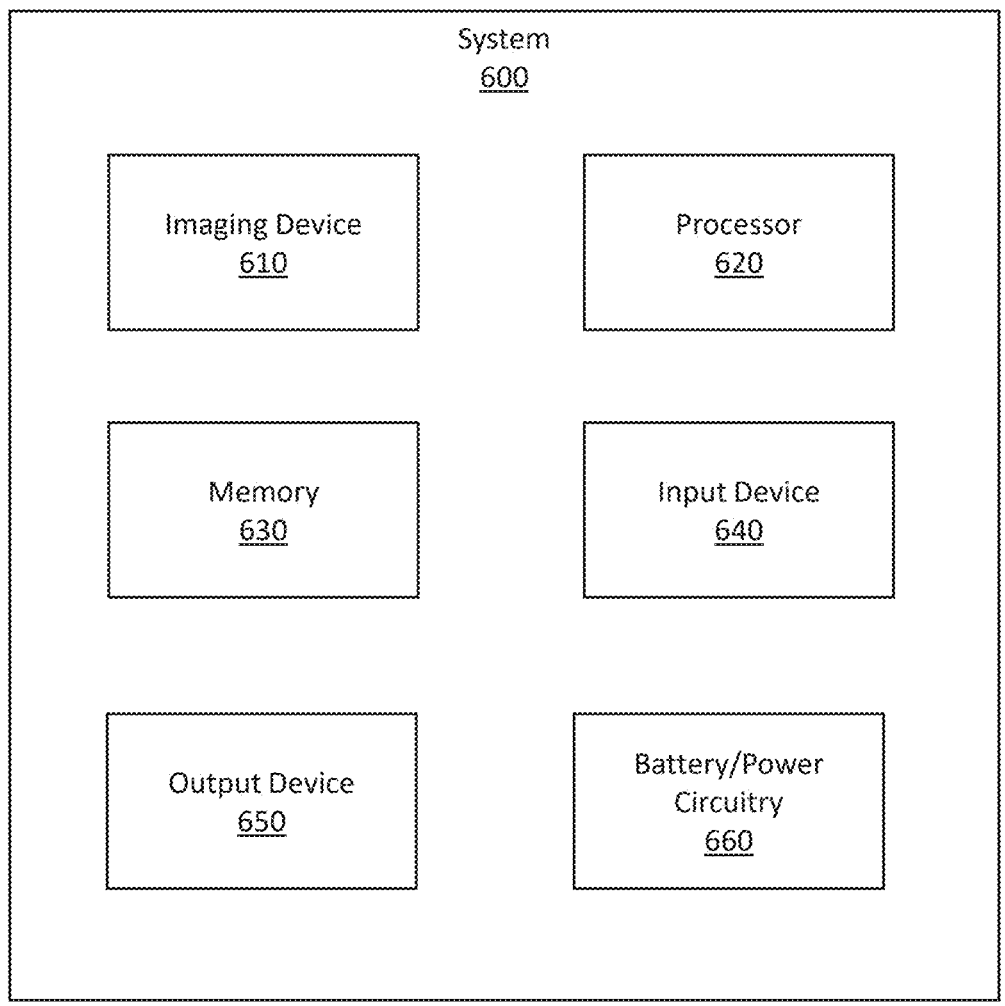
FIG. 6 illustrates an example system incorporating a depth estimation system according to some embodiments of the present disclosure.

FIG. 6 illustrates an example system 600 incorporating a depth estimation system according to some embodiments of the present disclosure. An embodiment of the depth estimation system is the depth estimation system 100 in FIG. 1. The system 600 includes an imaging device 610, a processor 620, a memory 630, an input device 640, an output device 650, and a battery/power circuitry 660. In other embodiments, the system 600 may include fewer, more, or different components. For instance, the system 600 may include multiple processors, memories, display devices, input devices, or output devices.

The imaging device 610 captures depth images and brightness images. The imaging device 610 may include an illuminator assembly, such as the illuminator assembly 110, for projecting light into an environment surrounding the system 600. The imaging device 610 can project modulated light, such as pulsed modulated light or continuous waves of modulated light. The imaging device 610 also includes a camera assembly, such as the camera assembly 120, that captures light reflected by one or more objects in the environment and generates image data of the one or more objects.

The processor 620 can process electronic data from registers and/or memory to transform that electronic data into other electronic data that may be stored in registers and/or memory. The processor 620 may perform some or all functions of some or all components of the controller 130, such as depth estimation, enhancing depth estimation with brightness signa, and so on. The processor 620 may include one or more digital signal processors (DSPs), application-specific integrated circuits (ASICs), CPUs, GPUs, crypto-processors (specialized processors that execute cryptographic algorithms within hardware), server processors, or any other suitable processing devices.

In some embodiments, the processor 620 may also use depth information (e.g., enhanced depth images) to generate content (e.g., images, audio, etc.) for display to a user of the system by one or more display devices, such as the output device 650. The content may be used as VR, AR, or MR content. The processor 620 may also generate instructions for other components of the system 600 or another system based on enhanced depth images. For instance, the processor 620 may determine a navigation instruction for a movable device, such as a robot, a vehicle, or other types of movable devices. The navigation instruction may include navigation parameters (e.g., navigation routes, speed, orientation, and so on).

The memory 630 may include one or more memory devices such as volatile memory (e.g., DRAM), nonvolatile memory (e.g., read-only memory (ROM)), flash memory, solid state memory, and/or a hard drive. In some embodiments, the memory 630 may include memory that shares a die with the processor 620. The memory 630 may store processor-executable instructions for controlling operation of the depth estimation system 100, and/or data captured by the depth estimation system 100. In some embodiments, the memory 630 includes one or more non-transitory computer-readable media storing instructions executable to perform depth estimation enhancement processes, e.g., the method 1000 described below in conjunction with FIG. 10, or the operations performed by the controller 130 (or some of the components of the controller 130) described above in conjunction with FIG. 1 and FIG. 4. The instructions stored in the one or more non-transitory computer-readable media may be executed by the processor 620.

The input device 640 may include an audio input device. The audio input device 1318 may include any device that generates a signal representative of a sound, such as microphones, microphone arrays, digital instruments (e.g., instruments having a musical instrument digital interface (MIDI) output), and so on. The input device 640 may also include one or more other types of input devices, such as accelerometer, gyroscope, compass, image capture device, keyboard, cursor control device (such as a mouse), stylus, touchpad, bar code reader, Quick Response (QR) code reader, sensor, radio frequency identification (RFID) reader, and so on.

The output device 650 may include one or more display devices, such as one or more visual indicators. Example visual indicators include heads-up display, computer monitor, projector, touchscreen display, liquid crystal display (LCD), light-emitting diode display, or flat panel display, and so on. The output device 650 may also include an audio output device. The audio output device may include any device that generates an audible indicator, such as speakers, headsets, or earbuds, and so on. The output device 650 may also include one or more other output devices, such as audio codec, video codec, printer, wired or wireless transmitter for providing information to other devices, and so on.

The battery/power circuitry 660 may include one or more energy storage devices (e.g., batteries or capacitors) and/or circuitry for coupling components of the system 600 to an energy source separate from the system 600 (e.g., AC line power).

Figure 7:
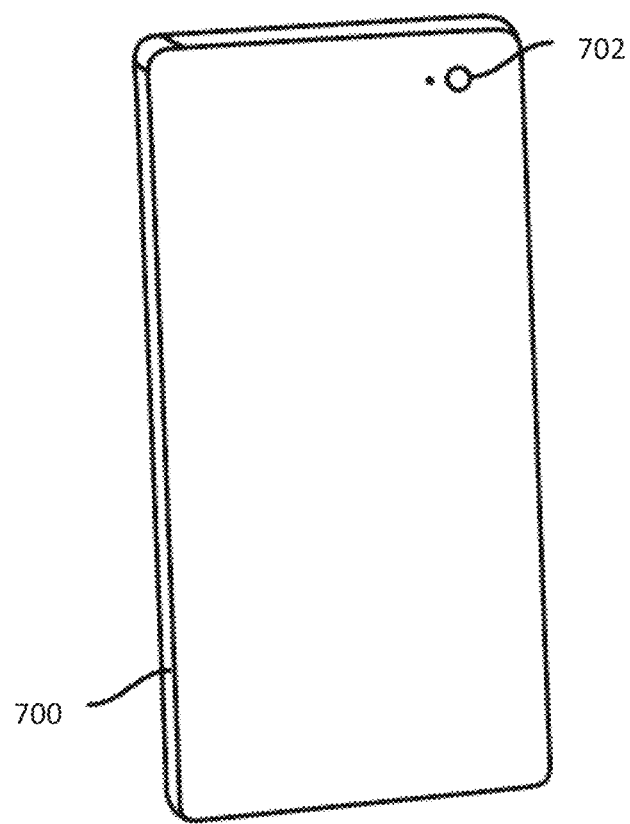
FIG. 7 illustrates a mobile device incorporating a depth estimation system according to some embodiments of the present disclosure.

FIG. 7 illustrates a mobile device 700 incorporating a depth estimation system according to some embodiments of the present disclosure. An example of the depth estimation system is the depth estimation system 100 in FIG. 1. The mobile device 700 may be a mobile phone. As shown in FIG. 7, the mobile device 700 includes an imaging assembly 702. The imaging device may include the illuminator assembly 110 and the camera assembly 120 in FIG. 1. The imaging assembly 702 may illuminate the environment surrounding the robot 902 with modulated light (e.g., modulated IR) and capture images of one or more objects in the environment. Even though not shown in FIG. 7, the mobile device 700 may include one or more processors and one or more memories that can perform some or all of the functions of the controller 130. With these components, the mobile device 700 may determine depth information of one or more objects in an environment surrounding the mobile device 700. The depth information can be used, by the mobile device 700, another device, or a user of the mobile device, for various purposes, such as VR, AR, or MR applications, navigation applications, and so on. For instance, the mobile device 700 may generate and present images (two-dimensional or three-dimensional images) based on the depth information of the environment, and the images may represent virtual objects that do not exist in the real-world environment. The images may augment the real-world objects in the environment so that a user of the mobile device 700 may have an interactive experience of the real-world environment where the real-world objects that reside in the real world are enhanced by computer-generated virtual objects.

Figure 8:
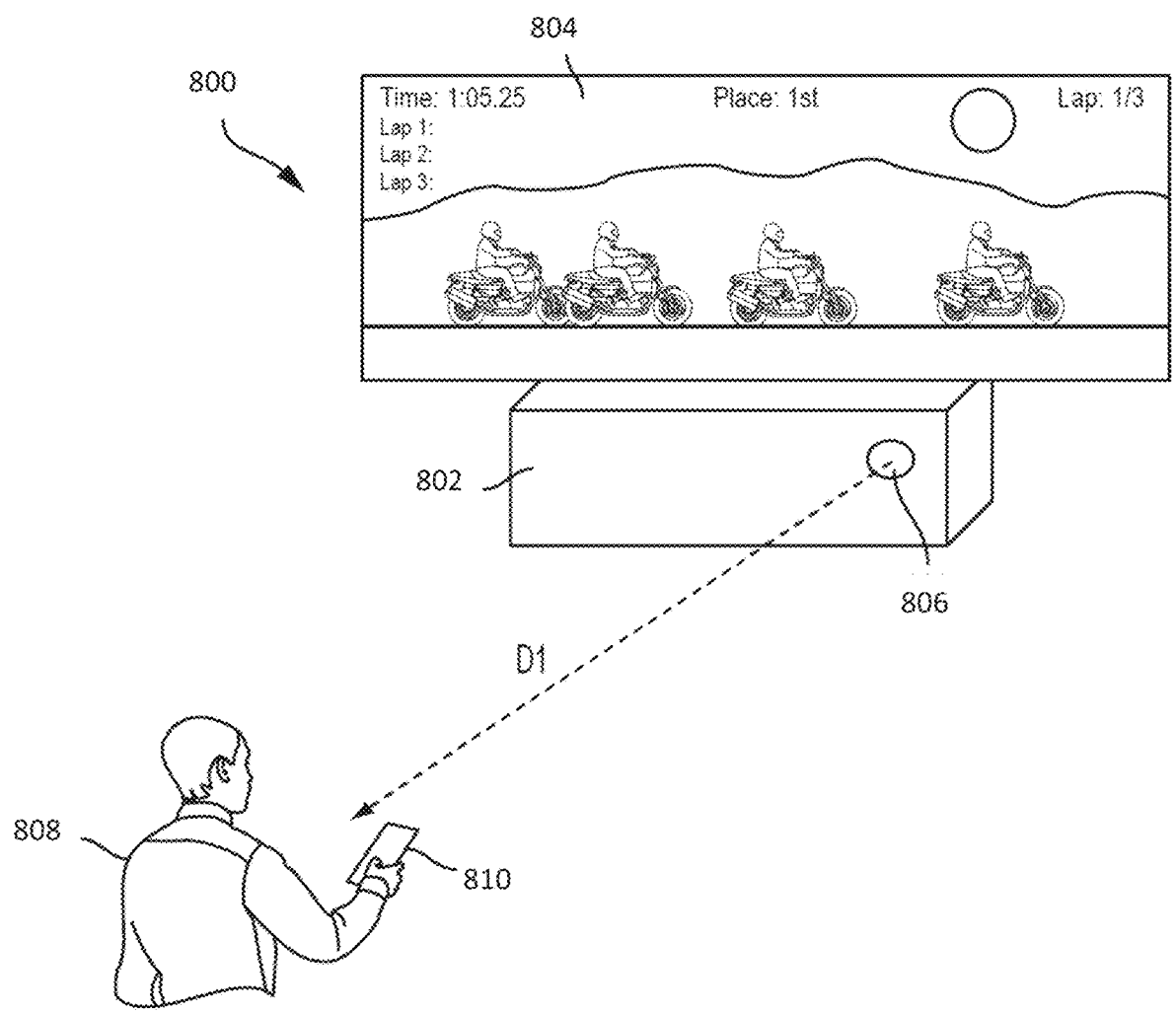
FIG. 8 illustrates an entertainment system incorporating a depth estimation system according to some embodiments of the present disclosure.

FIG. 8 illustrates an entertainment system 800 incorporating a depth estimation system according to some embodiments of the present disclosure. In the example of FIG. 8, a user 808 may interact with the entertainment system via a controller 810, for example to play a video game. The entertainment system 800 includes a console 802 and display 804. The console 802 may be a video gaming console configured to generate images of a video game on the display 804. In other embodiments, the entertainment system 800 may include more, fewer, or different components.

The console 802 includes an imaging assembly 806. The imaging assembly 806 may include the illuminator assembly 110 and the camera assembly 120 in FIG. 1. The imaging assembly 806 may illuminate the environment surrounding the entertainment system 800 with modulated light (e.g., modulated IR) and capture modulated light reflected by one or more objects in the environment to generate images of the objects, such as the user 808, controller 810, or other objects. Even though not shown in FIG. 8, the console 802 may include one or more processors and one or more memories that can perform some or all of the functions of the controller 130. The console 802 may determine depth information of one or more objects in the environment. The depth information may be used to present images to the user on the display 804 or for control of some other aspect of the entertainment system 800. For example, the user 808 may control the entertainment system 800 with hand gestures, and the gestures may be determined at least in part through the depth information. The console 802 may generate or update display content (e.g., images, audio, etc.) based on the depth information and may also instruct the display 804 to present the display content to the user 808.

Figure 9:
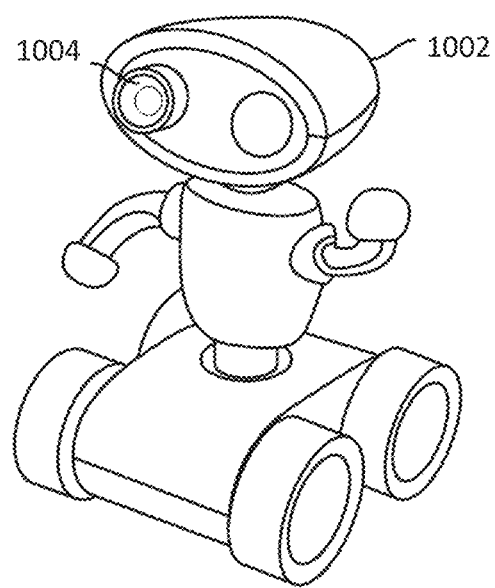
FIG. 9 illustrates an example robot 902 incorporating a depth estimation system according to some embodiments of the present disclosure.

FIG. 9 illustrates an example robot 902 incorporating a depth estimation system according to some embodiments of the present disclosure. The robot 902 includes an imaging assembly 904 that may include the illuminator assembly 110 and the camera assembly 120 in FIG. 1. The imaging assembly 904 may illuminate the environment surrounding the robot 902 with modulated light (e.g., modulated IR) and capture images of one or more objects in the environment. Even though not shown in FIG. 9, the robot 902 may include a computing device that can perform some or all of the functions of the controller 130. The computing device may include one or more processors and one or more memories. The computing device may determine depth information of one or more objects in the environment. The robot 902 may be mobile and the computing device may use the depth information to assist in navigation and/or motor control of the robot 902. For instance, the computing device may include a navigation instruction based on the depth information. The navigation instruction may include a navigation route of the robot 902. The robot 902 may navigate in the environment in accordance with the navigation instruction.

Examples of uses of the technology described herein beyond those shown in FIGS. 7-9 are also possible. For example, the depth estimation system described herein may be used in other applications, such as autonomous vehicles, security cameras, and so on.

Example Method of Using Guided Filter to Enhance Depth Estimation

Figure 10:
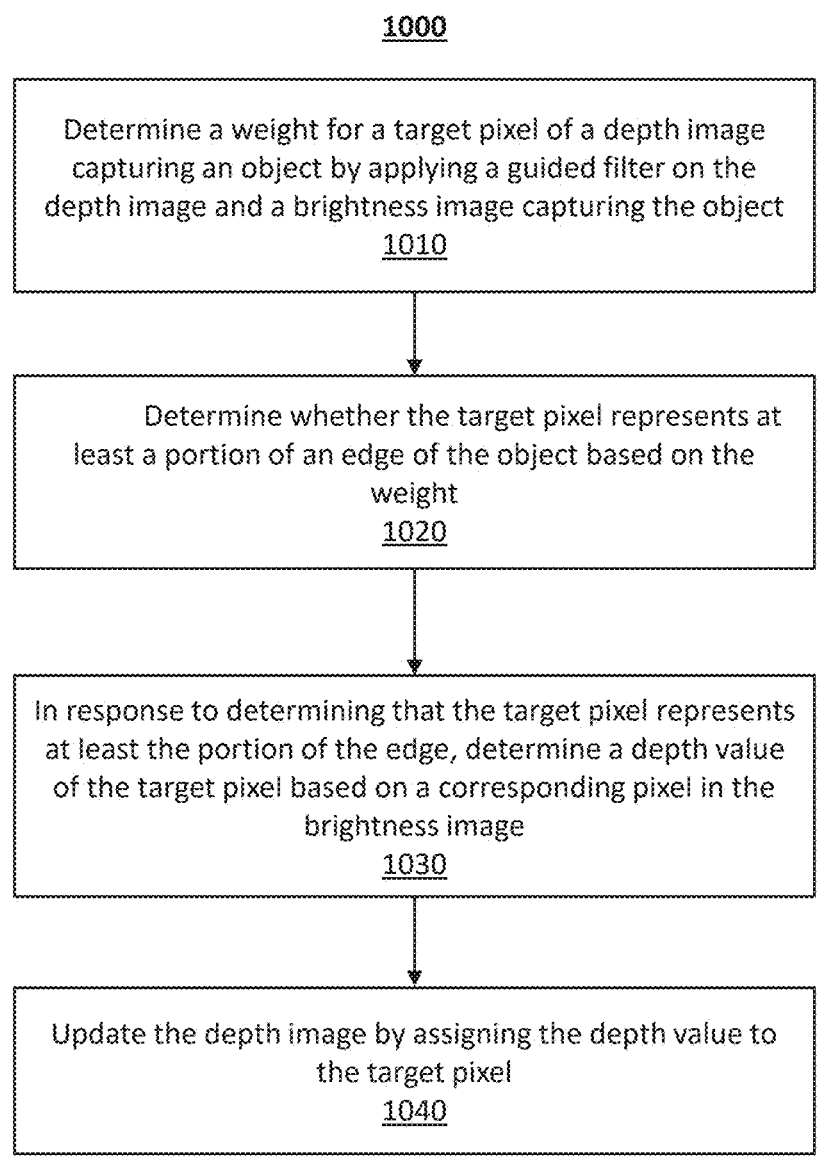
FIG. 10 is a flowchart showing a method of using a guided filter to enhance depth estimation, according to some embodiments of the present disclosure.

FIG. 10 is a flowchart showing a method 1000 of using a guided filter to enhance depth estimation, according to some embodiments of the present disclosure. The method 1000 may be performed by the controller 130. Although the method 1000 is described with reference to the flowchart illustrated in FIG. 10, many other methods of using a guided filter to enhance depth estimation may alternatively be used. For example, the order of execution of the steps in FIG. 10 may be changed. As another example, some of the steps may be changed, eliminated, or combined.

The controller 130 determines, in 1010, a weight for a target pixel of a depth image capturing an object based on the depth image and a brightness image capturing the object. The depth image and the brightness image may be generated based on image data from a same image sensor. The depth image may be an input image of the guided filter, and the brightness image may be a guidance image of the guided filter.

In some embodiments, the controller 130 instructs an illuminator assembly to project modulated light into a local area including the object. The modulated light may be modulated IR. The modulated light may include one or more continuous waves. In some embodiments, such as embodiments where the modulated light includes multiple continuous waves, the continuous waves may have different frequencies, phase offsets, or both. The controller 130 also instructs a camera assembly to capture reflected light from at least a portion of the object. In some embodiments, the controller 130 instructs the camera assembly to take exposures in a plurality of exposure intervals. For instance, the controller 130 instructs the camera assembly to take a plurality of exposure intervals for a single continuous wave of the modulated light, and each exposure intervals may correspond to a different phase offset. The controller 130 can generate the depth image based on a phase shift between the reflected light and the modulated light projected into the local area. The controller 130 can also generate the brightness image based on brightness of the reflected light.

The controller 130 determines, in 1020, whether the target pixel represents at least a portion of a boundary of the object based on the weight. In some embodiments, the controller 130 determines whether a value of the weight is equal or substantially similar to 1 and in response to determining that the value of the weight is equal or substantially similar to 1, the controller 130 determines that the target pixel represents at least the portion of the boundary of the object. In some embodiments, the controller 130 determines whether a value of the weight is equal or substantially similar to 0 and in response to determining that the value of the weight is equal or substantially similar to 0, the controller 130 determines that the target pixel represents at least the portion of the boundary of the object. For instance, the controller 130 may determine that the target pixel represents a portion of a flat plane of the object.

In response to determining that the target pixel represents at least the portion of the boundary, the controller 130 determines, in 1030, a depth value of the target pixel based on a brightness value of a corresponding pixel in the brightness image. The depth value of the target pixel may be independent of the value of the target pixel in the depth image, i.e., the original depth value of the target pixel. In some embodiments, in response to determining that the target pixel does not represent any portion of the boundary, the controller 130 determines the depth value for the target pixel based on depth values of other pixels in the depth image. The other pixels surround the target pixel. The depth value for the target pixel is an average of the depth values of the other pixels. The controller 130 may identify the other pixels by defining a box in the depth image. The box may be centered at the target pixel. The other pixels are in the box. For instance, the controller 130 may define a 3×3 box centered at the target pixel. The box also includes eight other pixels that adjoins and surrounds the target pixel. The depth value of the target pixel may be an average of the depth values of the eight pixels in the depth image.

The controller 130 updates, in 1040, the depth image by assigning the depth value to the target pixel. The controller 130 may generate an enhanced depth image based on the depth value. The enhanced depth image represents better depth estimation than the depth image, as the depth value of the target pixel in the enhanced depth image has a better accuracy than the depth value of the target pixel in the depth image.

Variations and Implementations

While embodiments of the present disclosure were described above with references to exemplary implementations as shown in FIGS. 1-10, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as filters, converters, mixers, amplifiers, digital logic circuitries, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to fractional frequency dividers, in various communication systems.

Parts of various systems for implementing duty cycle-regulated, balanced fractional frequency divider as proposed herein can include electronic circuitry to perform the functions described herein. In some cases, one or more parts of the system can be provided by a processor specially configured for carrying out the functions described herein. For instance, the processor may include one or more application-specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application-specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio-frequency (RF) functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the apparatuses and/or RF device shown in FIGS. 1-2, 4-5, 7, and 9-10) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:
 "comprise," "comprising," and the like are to be construed in an inclusive sense, as opposed to an exclusive or exhaustive sense; that is to say, in the sense of "including, but not limited to".
 "connected," "coupled," or any variant thereof, means any connection or coupling, either direct or indirect, between two or more elements; the coupling or connection between the elements can be physical, logical, or a combination thereof.
 "herein," "above," "below," and words of similar import, when used to describe this specification shall refer to this specification as a whole and not to any particular portions of this specification.
 "or," in reference to a list of two or more items, covers all of the following interpretations of the word: any of the items in the list, all of the items in the list, and any combination of the items in the list.
 the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

SELECT EXAMPLES

Example 1 provides a method, including: determining a weight for a target pixel of a depth image capturing an object based on the depth image and a brightness image capturing the object; determining whether the target pixel represents at least a portion of a boundary of the object based on the weight; in response to determining that the target pixel represents at least the portion of the boundary, determining a depth value of the target pixel based on a brightness value of a corresponding pixel in the brightness image; and updating the depth image by assigning the depth value to the target pixel.

Example 2 provides the method of example 1, further including: in response to determining that the target pixel does not represent any portion of the boundary, determining the depth value for the target pixel based on depth values of other pixels in the depth image, where the other pixels surround the target pixel.

Example 3 provides the method of example 2, where the depth value for the target pixel is an average of the depth values of the other pixels.

Example 4 provides the method of example 1, where the depth image is used as an input image of a guided filter, and the brightness image is used as a guidance image of the guided filter.

Example 5 provides the method of example 1, where the depth image and the brightness image are generated based on image data from a same image sensor.

Example 6 provides the method of example 1, further including: instructing an illuminator assembly to project modulated light into a local area including the object; instructing a camera assembly to capture reflected light from at least a portion of the object; and generating the depth image based on a phase shift between the reflected light and the modulated light projected into the local area.

Example 7 provides the method of example 6, further including: generating the brightness image based on brightness of the reflected light.

Example 8 provides the method of example 6, where the modulated light includes continuous waves of IR, and the continuous waves have different modulation frequencies.

Example 9 provides the method of example 1, where determining whether the target pixel represents at least the portion of the boundary of the object including: determining whether a value of the weight is equal or substantially similar to 1; and in response to determining that the value of the weight is equal or substantially similar to 1, determining that the target pixel represents at least the portion of the boundary of the object.

Example 10 provides the method of example 1, where determining whether the target pixel represents at least the portion of the boundary of the object includes: determining whether a value of the weight is equal or substantially similar to 0; and in response to determining that the value of the weight is equal or substantially similar to 0, determining that the target pixel does not represent any portion of the boundary of the object.

Example 11 provides a system, including: an illuminator assembly configured to project modulated light into a local area including an object; a camera assembly configured to capture reflected light from at least a portion of the object; and a controller configured to: generate a depth image and a brightness image based on the reflected light, determine a weight for a target pixel of the depth image by applying a guided filter on the depth image and the brightness image, determine whether the target pixel represents at least a portion of a boundary of the object based on the weight, in response to determining that the target pixel represents at least the portion of the boundary, determine a depth value of the target pixel based on a brightness value of a corresponding pixel in the brightness image, and generating an enhanced depth image based on the depth value of the target pixel.

Example 12 provides the system of example 11, further including a display configured to present one or more images generated based on the enhanced depth image.

Example 13 provides the method of example 11, where the controller is further configured to generate a navigation instruction for a mobile device based on the enhanced depth image.

Example 14 provides the system of example 11, where the controller is further configured to: in response to determining that the target pixel does not represent any portion of the boundary, determine the depth value for the target pixel based on depth values of other pixels in the depth image, where the other pixels surround the target pixel.

Example 15 provides the system of example 11, where the controller is configured to generate the depth image and the brightness image based on the reflected light by: generating the depth image based on a phase shift between the reflected light and the modulated light projected into the local area; and generating the brightness image based on brightness of the reflected light.

Example 16 provides one or more non-transitory computer-readable media storing instructions executable to perform operations, the operations including: determining a weight for a target pixel of a depth image capturing an object based on the depth image and a brightness image capturing the object; determining whether the target pixel represents at least a portion of a boundary of the object based on the weight; in response to determining that the target pixel represents at least the portion of the boundary, determining a depth value of the target pixel based on a brightness value of a corresponding pixel in the brightness image; and
updating the depth image by assigning the depth value to the target pixel.

Example 17 provides the one or more non-transitory computer-readable media of example 16, where the operations further include: in response to determining that the target pixel does not represent any portion of the boundary, determining the depth value for the target pixel based on depth values of other pixels in the depth image, where the other pixels surround the target pixel.

Example 18 provides the one or more non-transitory computer-readable media of example 16, where the depth image is used as an input image of a guided filter, and the brightness image is used as a guidance image of the guided filter.

Example 19 provides the one or more non-transitory computer-readable media of example 16, where the depth image and the brightness image are generated based on image data from a same image sensor.

Example 20. The one or more non-transitory computer-readable media of example 16, where the operations further include: instructing an illuminator assembly to project modulated light into a local area including the object; instructing a camera assembly to capture reflected light from at least a portion of the object; generating the depth image based on a phase shift between the reflected light and the modulated light projected into the local area; and generating the brightness image based on brightness of the reflected light.

The invention claimed is:
1. A method, comprising:
   determining a weight for a target pixel of a depth image representing an object based on the depth image and a brightness image representing the object;
   determining whether the target pixel represents at least a portion of a boundary of the object based on the weight;

in response to determining that the target pixel represents at least the portion of the boundary, determining a depth value of the target pixel based on a brightness value of a corresponding pixel in the brightness image; and
updating the depth image by assigning the depth value to the target pixel.

2. The method of claim 1, further comprising:
in response to determining that the target pixel does not represent any portion of the boundary, determining the depth value for the target pixel based on depth values of other pixels in the depth image, wherein the other pixels surround the target pixel.

3. The method of claim 2, wherein the depth value for the target pixel is a weighted average of the depth values of the other pixels.

4. The method of claim 1, wherein the depth image is used as an input image of a guided filter, and the brightness image is used as a guidance image of the guided filter.

5. The method of claim 1, wherein the depth image and the brightness image are generated based on image data from a same image sensor.

6. The method of claim 1, further comprising:
instructing an illuminator assembly to project modulated light into a local area including the object;
instructing a camera assembly to capture reflected light from at least a portion of the object; and
generating the depth image based on a phase shift between the reflected light and the modulated light projected into the local area.

7. The method of claim 6, further comprising:
generating the brightness image based on brightness of the reflected light.

8. The method of claim 6, wherein the modulated light includes continuous waves of infrared light, the continuous waves having different modulation frequencies.

9. The method of claim 1, wherein determining whether the target pixel represents at least the portion of the boundary of the object comprises:
determining whether a value of the weight is equal or substantially similar to 1; and
in response to determining that the value of the weight is equal or substantially similar to 1, determining that the target pixel represents at least the portion of the boundary of the object.

10. The method of claim 1, wherein determining whether the target pixel represents at least the portion of the boundary of the object comprises:
determining whether a value of the weight is equal or substantially similar to 0; and
in response to determining that the value of the weight is equal or substantially similar to 0, determining that the target pixel does not represent any portion of the boundary of the object.

11. A system, comprising:
a camera assembly configured to capture reflected light from at least a portion of an object; and
a controller configured to:
generate a depth image based on the reflected light,
generate a brightness image based on the reflected light,
determine a weight for a target pixel of the depth image by applying a guided filter on the depth image and the brightness image,
determine whether the target pixel represents at least a portion of a boundary of the object based on the weight,
in response to determining that the target pixel represents at least the portion of the boundary, determine a depth value of the target pixel based on a brightness value of a corresponding pixel in the brightness image, and
generate an enhanced depth image based on the depth value of the target pixel.

12. The system of claim 11, further comprising a display configured to present one or more images generated based on the enhanced depth image.

13. The system of claim 11, wherein the controller is further configured to generate a navigation instruction for a mobile device based on the enhanced depth image.

14. The system of claim 11, wherein the controller is further configured to:
in response to determining that the target pixel does not represent any portion of the boundary, determine the depth value for the target pixel based on depth values of other pixels in the depth image, wherein the other pixels surround the target pixel.

15. The system of claim 11, wherein the controller is further configured to generate the depth image and the brightness image based on the reflected light by:
generating the depth image based on a phase shift between the reflected light and modulated light projected into a local area including the object; and
generating the brightness image based on brightness of the reflected light.

16. One or more non-transitory computer-readable media storing instructions executable to perform operations, the operations comprising:
determining a weight for a target pixel of a depth image capturing an object based on the depth image and a brightness image capturing the object;
determining whether the target pixel represents at least a portion of a boundary of the object based on the weight;
in response to determining that the target pixel represents at least the portion of the boundary, determining a depth value of the target pixel based on a brightness value of a corresponding pixel in the brightness image; and
updating the depth image by assigning the depth value to the target pixel.

17. The one or more non-transitory computer-readable media of claim 16, wherein the operations further comprise:
in response to determining that the target pixel does not represent any portion of the boundary, determining the depth value for the target pixel based on depth values of other pixels in the depth image, wherein the other pixels surround the target pixel.

18. The one or more non-transitory computer-readable media of claim 16, wherein the depth image is used as an input image of a guided filter, and the brightness image is used as a guidance image of the guided filter.

19. The one or more non-transitory computer-readable media of claim 16, wherein the depth image and the brightness image are generated based on image data from a same image sensor.

20. The one or more non-transitory computer-readable media of claim 16, wherein the operations further comprise:
instructing an illuminator assembly to project modulated light into a local area including the object;
instructing a camera assembly to capture reflected light from at least a portion of the object;
generating the depth image based on a phase shift between the reflected light and the modulated light projected into the local area; and generating the brightness image based on brightness of the reflected light.

\* \* \* \* \*